US009344426B2

(12) United States Patent
Gupta et al.

(10) Patent No.: US 9,344,426 B2
(45) Date of Patent: May 17, 2016

(54) ACCESSING ENTERPRISE RESOURCES WHILE PROVIDING DENIAL-OF-SERVICE ATTACK PROTECTION

(71) Applicant: Citrix Systems, Inc., Fort Lauderdale, FL (US)

(72) Inventors: Punit Gupta, Distt.-Sidhi (IN); Bharat Bhushan, Bangalore (IN); Jong Kann, Santa Clara, CA (US); Pierre Rafiq, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/140,843

(22) Filed: Dec. 26, 2013

(65) Prior Publication Data
US 2015/0046997 A1 Feb. 12, 2015

Related U.S. Application Data

(60) Provisional application No. 61/823,096, filed on May 14, 2013.

(51) Int. Cl.
H04L 29/06 (2006.01)
G06F 21/31 (2013.01)
H04L 9/32 (2006.01)

(52) U.S. Cl.
CPC .............. *H04L 63/083* (2013.01); *G06F 21/31* (2013.01); *H04L 9/32* (2013.01); *H04L 63/0272* (2013.01); *H04L 63/08* (2013.01); *H04L 63/0815* (2013.01); *H04L 63/1458* (2013.01)

(58) Field of Classification Search
CPC ... G06F 21/31; H04L 63/083; H04L 63/1458; H04L 63/0272; H04L 9/32
See application file for complete search history.

(56) References Cited

U.S. PATENT DOCUMENTS

| 6,226,752 | B1 * | 5/2001 | Gupta et al. | 726/9 |
| 7,240,192 | B1 * | 7/2007 | Paya et al. | 713/152 |
| 8,090,877 | B2 * | 1/2012 | Agarwal et al. | 709/246 |
| 8,495,195 | B1 * | 7/2013 | Abidogun | H04L 67/04 709/223 |
| 8,613,089 | B1 * | 12/2013 | Holloway | H04L 63/1458 709/217 |
| 8,689,303 | B1 * | 4/2014 | Abidogun | H04L 63/08 709/223 |

(Continued)

FOREIGN PATENT DOCUMENTS

EP 1422907 A2 5/2004
WO 0069110 A1 11/2000

OTHER PUBLICATIONS

Kristol Bell Laboratories D et al. "HTTP State Management Mechanism; rfc2965.txt", Oct. 1, 2000.

*Primary Examiner* — Hadi Armouche
*Assistant Examiner* — Sher A Khan
(74) *Attorney, Agent, or Firm* — Banner & Witcoff, Ltd.

(57) ABSTRACT

Techniques for accessing enterprise resources while providing denial-of-service attack protection may include receiving, at a gateway from a client device, a request for a resource, the request including a location identifier associated with the resource. Techniques may further include redirecting, by a redirection message, the request to an authentication device that requests credentials for authentication, the redirection message including the location identifier. Techniques may also include retrieving, after authentication of the credentials, the location identifier from the client device. Techniques may additionally include providing access to the resource based on the location identifier.

18 Claims, 4 Drawing Sheets

(56) References Cited

U.S. PATENT DOCUMENTS

| | | | |
|---|---|---|---|
| 2003/0163575 A1* | 8/2003 | Perkins | G06F 9/5055 709/229 |
| 2006/0021004 A1 | 1/2006 | Moran et al. | |
| 2006/0230265 A1* | 10/2006 | Krishna | H04L 63/08 713/158 |
| 2007/0157300 A1* | 7/2007 | Sivaradjane | H04L 63/1458 726/9 |
| 2008/0127323 A1* | 5/2008 | Soin et al. | 726/12 |
| 2008/0289025 A1* | 11/2008 | Schneider | H04L 63/123 726/10 |
| 2009/0282239 A1* | 11/2009 | Doleh | 713/155 |
| 2009/0319776 A1* | 12/2009 | Burch et al. | 713/155 |
| 2010/0138534 A1* | 6/2010 | Mutnuru | H04L 43/0817 709/224 |
| 2011/0320820 A1* | 12/2011 | Wray | 713/176 |
| 2012/0002813 A1* | 1/2012 | Wei et al. | 380/270 |
| 2012/0069131 A1* | 3/2012 | Abelow | G06Q 10/067 348/14.01 |
| 2013/0046869 A1* | 2/2013 | Jenkins et al. | 709/223 |
| 2013/0060889 A1* | 3/2013 | Miyazawa | 709/217 |
| 2013/0073609 A1* | 3/2013 | Connolly et al. | 709/203 |
| 2013/0227291 A1* | 8/2013 | Ahmed | H04L 63/0281 713/171 |
| 2013/0246603 A1* | 9/2013 | Davis | H04L 29/12216 709/224 |
| 2013/0246630 A1* | 9/2013 | Exton et al. | 709/227 |
| 2013/0263212 A1* | 10/2013 | Faltyn | H04W 12/08 726/1 |
| 2013/0332618 A1* | 12/2013 | Kasivajjula et al. | 709/228 |
| 2014/0089661 A1* | 3/2014 | Mahadik | H04L 61/1511 713/162 |
| 2014/0373138 A1* | 12/2014 | Park et al. | 726/22 |

* cited by examiner

ACCESSING ENTERPRISE RESOURCES WHILE PROVIDING DENIAL-OF-SERVICE ATTACK PROTECTION

CROSS-REFERENCE TO RELATED APPLICATIONS

This application claims priority to U.S. Provisional Patent Application Ser. No. 61/823,096, filed May 14, 2013, entitled "Systems and Methods for Accessing Enterprise Resources While Providing Denial of Service Attack Protection," which is incorporated by reference in its entirety.

FIELD

Aspects described herein generally relate to computing devices and computer networks. More specifically, aspects herein relate to interacting with enterprise-managed systems, application programs, and resources. Additionally, aspects herein relate to making enterprise resources both accessible and secure.

BACKGROUND

Many enterprise organizations (e.g., corporations, non-profits, governments, etc.) maintain computer networks that allow enterprise users, such as employees, to access enterprise applications, data, and services (collectively known simply as "resources"). Enterprise resources may include hardware and software email applications, customer-relationship management (CRM), enterprise-resource planning (ERP), documents, document-management services, enterprise-application stores, and the like. Computer networks and resources may include various cloud-computing components. Cloud-computing environments may include computers owned and managed by a cloud operator, with resources stored by those computers available for remote accessed by others—typically customers of the cloud operator.

Enterprises often allow remote access to enterprise resources. For example, when enterprise users are not directly connected to an enterprise network, they may remotely access enterprise resources using virtualization and other techniques. Also, many enterprises allow users to access enterprise resources via various types of computing devices, including desktop computers, mobile devices, laptops, smartphones, tablet computers, PDAs (personal digital assistant), and the like. Virtualized computing resources generally allow for the operating systems, applications, and user settings of multiple users to be included on a single physical machine. Desktop- and mobile-virtualization technology allows multiple instances of an operating system to be kept separate, so the activities of one user do not affect the experience of other users.

Enterprises typically deploy enterprise-management systems to assist in the management and control of remote access to enterprise resources by various types of computing devices. It is desirable in this scenario for the enterprise to maintain control over enterprise resources, which may be accessed by, run on, or stored on a mobile device.

SUMMARY

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below.

Enterprise resources are sometimes remotely accessed via an access gateway, wherein a user, via a client device (computing device), first accesses the access gateway and provides user credentials. The access gateway authenticates the client device upon presentation of valid user credentials, and then the access gateway typically redirects the client device to a common landing page that has links to various enterprise resources. In some cases however, a user may request access to a specific enterprise resource, such as via its Uniform Resource Location (URL), before being authenticated by the access gateway. This can occur, for example, if a user receives a link to a protected enterprise resource, such as in an email message, and clicks on the link. In such a case, because the user is not authenticated, the user is first redirected to the access gateway that authenticates the user. Post authentication, the user is typically then redirected to the common landing page, rather than to the specific enterprise resource. This can be problematic in that the user then has to figure out how to access the specific enterprise resource from the common landing page, often resulting in a less than positive experience for the user.

One method for solving this problem is for the access gateway to store an identifier of the specific requested enterprise resource, such as its URL (which is included in the user's access request), and, post authentication, redirect the client device directly to the specific requested enterprise resource, rather than the common landing page. But this solution can be problematic in that storage of the requested enterprise resource identifier consumes gateway resources (memory) and makes the gateway vulnerable to a denial-of-service attack.

Specifically, a denial-of-service attack is an attempt to make a machine or network resource unavailable to its intended users, typically by efforts to temporarily interrupt or suspend services of a host server connected to the Internet. A common method of attack involves saturating the target machine with external communications requests, so much so that it cannot respond to legitimate traffic, or responds so slowly as to be essentially rendered unavailable. In the case described above, if requested enterprise resource identifiers are stored by the gateway before user authentication, providing many requests for enterprise resources from unauthenticated rogue users could consume the storage capabilities of the access gateway and prevent it from servicing legitimate users.

Thus, in some embodiments, the specific requested enterprise resource identifier (such as URL) might not be stored by the access gateway before authentication. Rather, upon initiation of a request for access by an unauthenticated user, the access gateway provides an identification cookie as part of a redirection message to the requesting client device. In one embodiment, the identification cookie may include an identifier for the specific enterprise resource. This identifier can be obtained and used later once the client device is authenticated and securely in communication with the access gateway, such that the access gateway can obtain this information when needed without having to store it pre-authentication.

In some embodiments, a method for accessing an enterprise resource includes receiving, at a gateway, a resource request from a client device, wherein the resource request includes identification of a requested resource (e.g., in the form of an URL of the requested resource). The resource request is redirected, via a redirection message, to a gateway resource that requests credentials for authentication. As part of the redirection message, an identifier of the resource requested by the client device is provided to the client device and stored by the client device (e.g., by passing the URL of the requested resource within the redirection message in the form of a HTTP cookie). Upon authentication of the credentials by the gateway resource, the identifier is retrieved by the gateway resource and access is provided to the requested resource.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others.

Figure 1:
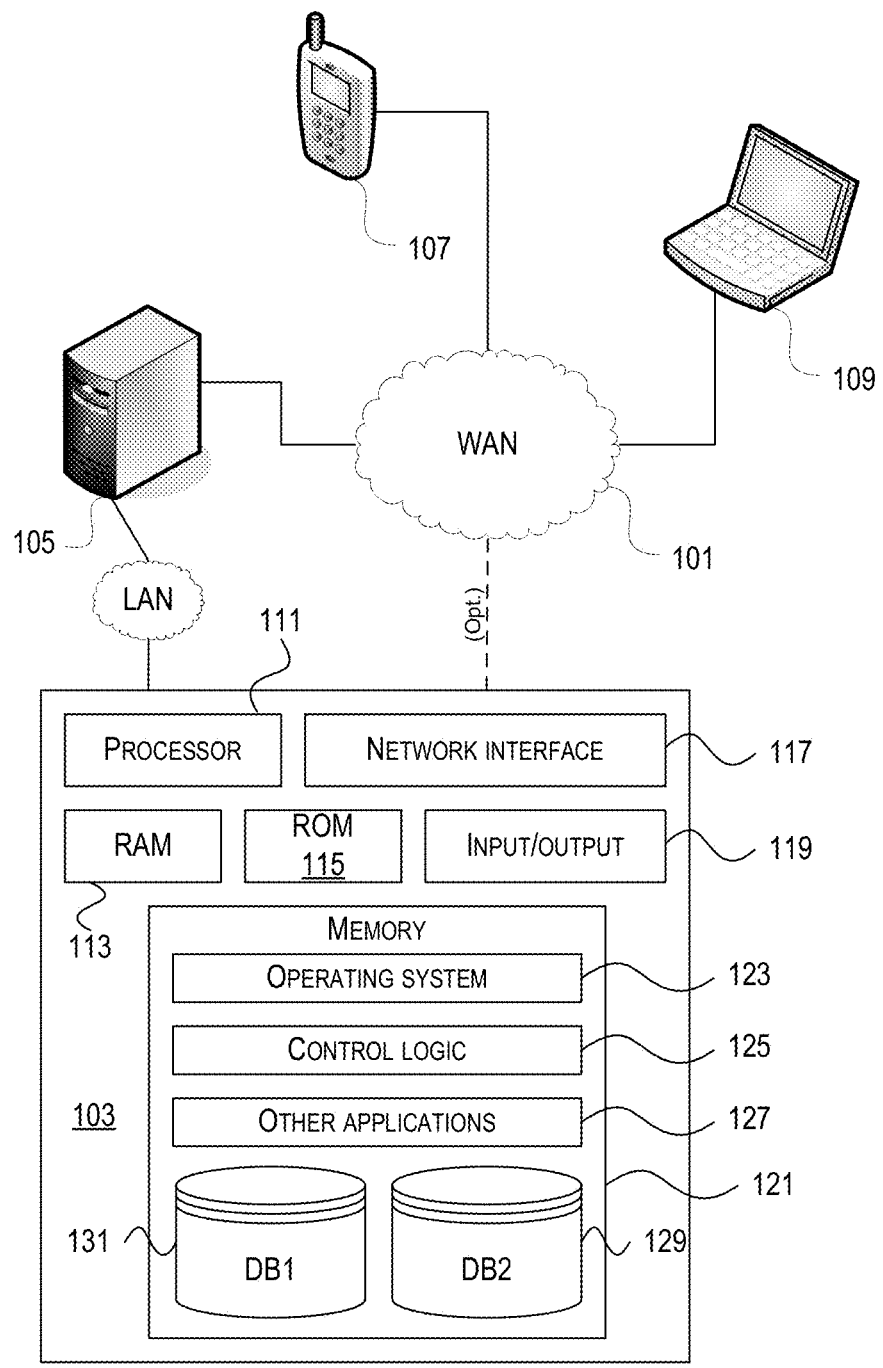
FIG. 1 depicts an illustrative computer system architecture that may be used in accordance with one or more illustrative aspects described herein.

FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality that may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Enterprise Mobility Management Architecture

Figure 2:
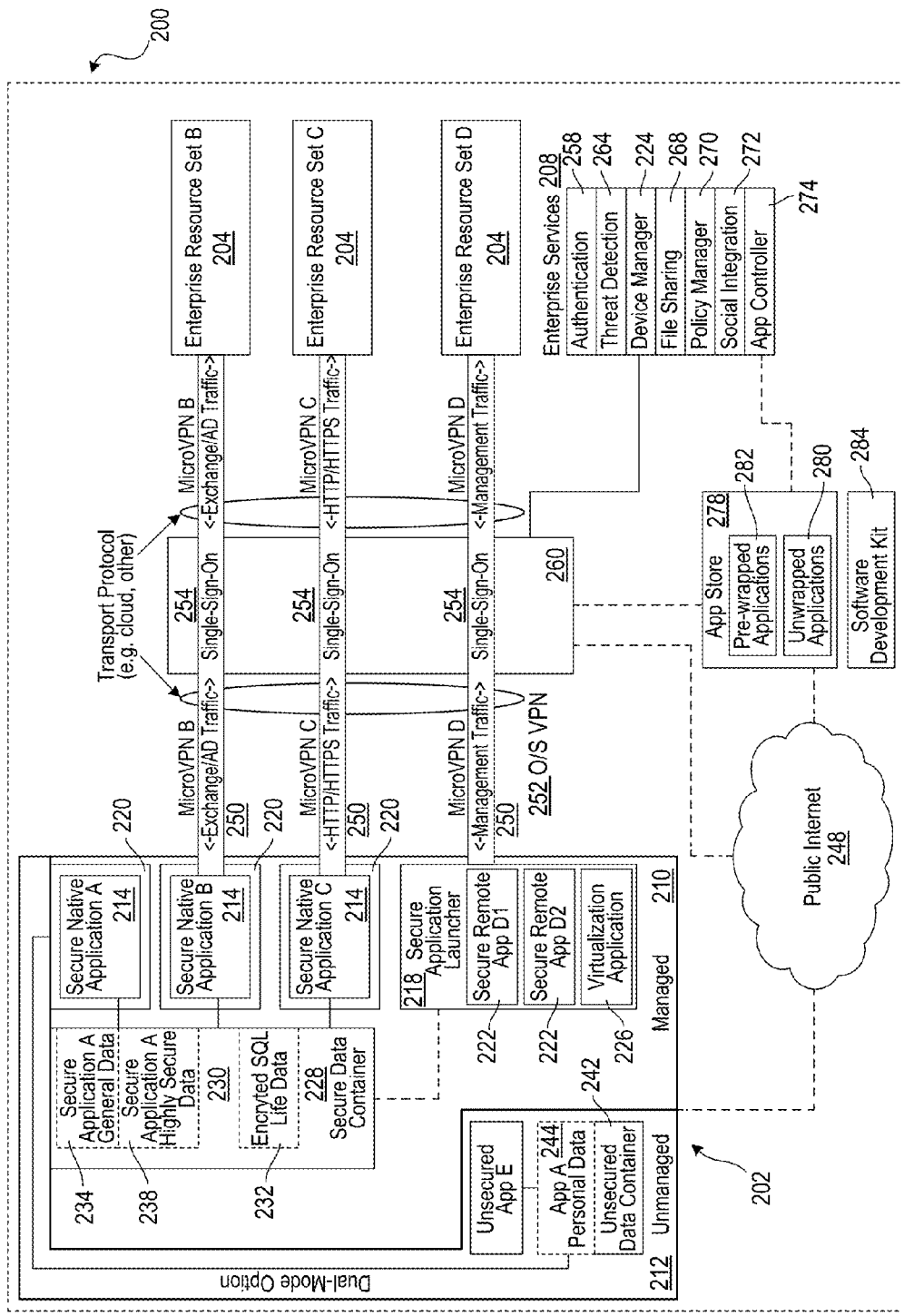
FIG. 2 depicts an illustrative enterprise mobility management system.

FIG. 2 represents an enterprise mobility technical architecture 200 for use in a bring-your-own-device (BYOD) environment. The architecture enables a user of a mobile device 202 to both access enterprise or personal resources from a mobile device 202 and use the mobile device 202 for personal use. The user may access such enterprise resources 204 or enterprise services 208 using a mobile device 202 that is purchased by the user or a mobile device 202 that is provided by the enterprise to the user. The user may utilize the mobile device 202 for business use only or for business and personal use. The mobile device 202 may run an iOS operating system, ANDROID operating system, and/or the like. The enterprise may choose to implement policies to manage the mobile device 202. The policies may be implanted through a firewall or gateway in such a way that the mobile device 202 may be identified, secured or security verified, and provided selective or full access to the enterprise resources. The policies may be mobile device management policies, mobile application management policies, mobile data management policies, or some combination of mobile device, application, and data management policies. A mobile device 202 that is managed through the application of mobile device management policies may be referred to as an enrolled device or a managed device.

In some embodiments, the operating system of the mobile device may be separated into a managed partition 210 and an unmanaged partition 212. The managed partition 210 may have policies applied to it to secure the applications running on and data stored in the managed partition. In other embodiments, all applications may execute in accordance with a set of one or more policy files received separate from the application, and that define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, WINDOWS Application access applications, and the like. The secure applications may be secure native applications 214, secure remote applications 222 executed by a secure application launcher 218, virtualization applications 226 executed by a secure application launcher 218, and the like. The secure native applications 214 may be wrapped by a secure application wrapper 220. The secure application wrapper 220 may include integrated policies that are executed on the mobile device 202 when the secure native application is executed on the device. The secure application wrapper 220 may include metadata that points the secure native application 214 running on the mobile device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 226 executed by a secure application launcher 218 may utilize resources on the mobile device 202, at the enterprise resources 204, and the like. The resources used on the mobile device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 228 in the managed partition 210 of the mobile device. The data secured in the secure data container may be accessed by the secure wrapped applications 214, applications executed by a secure application launcher 218, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as AES 128-bit encryption or the like, while highly secure data 238 may use a very strong form of encryption such as AES 256-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured mode. In an unsecured mode, the secure applications may access data stored in an unsecured data container 242 on the unmanaged partition 212 of the mobile device 202. The data stored in an unsecured data container may be personal data 244. The data stored in an unsecured data container 242 may also be accessed by unsecured applications 248 that are running on the unmanaged partition 212 of the mobile device 202. The data stored in an unsecured data container 242 may remain on the mobile device 202 when the data stored in the secure data container 228 is deleted from the mobile device 202. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 204 and enterprise services 208 at an enterprise, to the public Internet 248, and the like. The mobile device may connect to enterprise resources 204 and enterprise services 208 through virtual private network connections. The virtual private network connections (also referred to at microVPN or application-specific VPN) may be specific to particular applications 250, particular devices, particular secured areas on the mobile device, and the like (e.g., 252). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the mobile device 202. The access gateway may also re-route traffic from the mobile device 202 to the public Internet 248, enabling the mobile device 202 to access publicly available and unsecured applications that run on the public Internet 248. The mobile device may connect to the access gateway via a transport network 262. The transport network 262 may be a wired network, wireless network, cloud network, local area network, metropolitan area network, wide area network, public network, private network, and the like.

The enterprise resources 204 may include email servers, file sharing servers, SaaS applications, Web application servers, WINDOWS application servers, and the like. Email servers may include Exchange servers, Lotus Notes servers, and the like. File sharing servers may include ShareFile servers, and the like. SaaS applications may include Salesforce, and the like. WINDOWS application servers may include any application server that is built to provide applications that are intended to run on a local WINDOWS operating system, and the like. The enterprise resources 204 may be premise-based resources, cloud based resources, and the like. The enterprise resources 204 may be accessed by the mobile device 202 directly or through the access gateway 260. The enterprise resources 204 may be accessed by the mobile device 202 via a transport network 262. The transport network 262 may be a wired network, wireless network, cloud network, local area network, metropolitan area network, wide area network, public network, private network, and the like.

The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the mobile device 202, by the enterprise resources 204, and the like. The certificates stored on the mobile device 202 may be stored in an encrypted location on the mobile device, the certificate may be temporarily stored on the mobile device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the mobile device 202 through the access gateway 260, through the public Internet 248, or the like. The application store may be provided with an intuitive and easy to use user interface. The application store 278 may provide access to a software development kit 284. The software development kit 284 may provide a user the capability to secure applications selected by the user by wrapping the application as described previously in this description. An application that has been wrapped using the software development kit 284 may then be made available to the mobile device 202 by populating it in the application store 278 using the application controller 274.

The enterprise mobility technical architecture 200 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Accessing Resources

Figure 3:
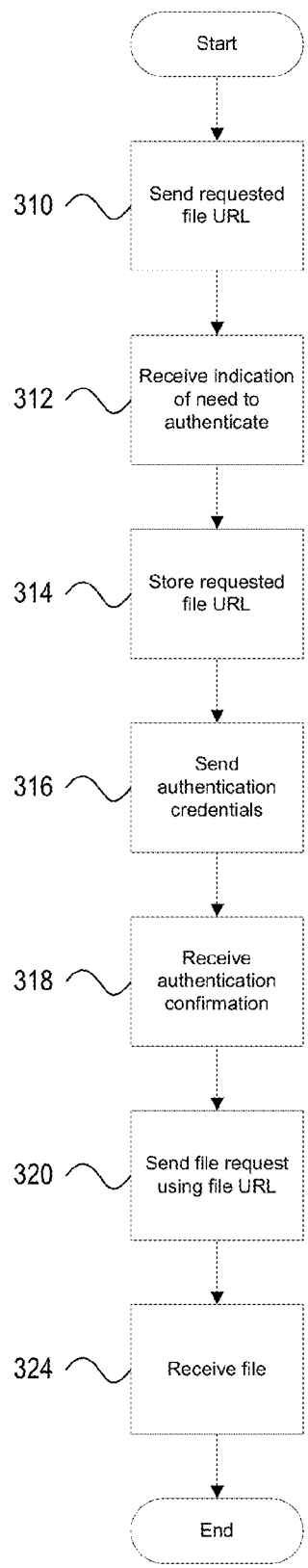
FIG. 3 depicts an illustrative method for accessing enterprise resources while providing denial-of-service attack protection that may be used in accordance with one or more illustrative aspects described herein.

FIG. 3 depicts one potential method for accessing enterprise resources while providing denial-of-service attack protection.

An enterprise user may use a client device to access an enterprise or cloud resource remotely through a gateway, server, appliance, or other computing device. In one example, the gateway may include a secure-sockets-layer virtual-private-network (SSLVPN) gateway. The client device may use a secure or nonsecure web browser on the client device. In another embodiment, the client device may use another secure or nonsecure application.

A resource may include a file or group of files (e.g., video, audio, text, etc.). A resource may also include a storage platform (e.g., one or more network-accessible drives). Alternatively, a resource may include access to a device (e.g., remote control or remote desktop access). Another example of a resource may include a program or web service that provides access to data or to other resources. A resource may also include access to a network or other system. A resource may further include an application store.

A resource may be protected by one or more authentication requirements. For example, authentication may be required to access a single file. Alternatively, authenticating once to a gateway affiliated with a network may be sufficient to access many or all of the files available on that network. Authentication may similarly protect access to all or part of a service or application. In one embodiment, authenticating user credentials may act as a single sign on for accessing a plurality of enterprise resources.

The client device and the gateway may not be affiliated with an enterprise—a user may simply request access to a resource stored on another device.

An enterprise user may have a link (e.g., a URL) directly to a specific enterprise resource. For example, the user may receive a link in an email, click on a link in a website, or otherwise access a resource.

In step 310, a client device may send to a server device a file access request. The server may host the file directly, or the server may simply control access to the file stored on a different device. The requested file may, for example, be stored on an enterprise resource.

The server device may detect that the client device does not have permission to access the requested file. For example, the server may require authentication for any file access.

In one example, the server device may detect that the client device is not authenticated. For example, the client device request may not include a required element in its request, such as an authentication key indicating the client device's authentication status. In another example, the server device may use a lookup table or some other method for determining the client device's authentication status. In a further example, the server may require an authentication or session cookie to verify the authentication state of the client device. If the server determines the client device is not authenticated, the server may transmit a signal to the client device indicating the client must authenticate.

For example, in step 312, the server may respond to the client device file access request with a response indicating the client device is not authorized. In one embodiment, the response may include authentication information, such as a URL associated with an authentication page. For example, the response may be a "HTTP 302 Redirect" response with the URL of the authentication page in the "Location Header."

The server response may also include the originally requested file's identifier (e.g., a URL) in the response indicating the client device's need to authenticate. In some aspects, the server response may include a cookie that includes the requested file's URL.

A cookie may include an HTTP state management mechanism as defined in the Internet Engineering Task Force (IETF) Request for Comments (RFC) 6265, published in April 2011. A cookie may have at least six components: name, value, expiry, path, domain, whether a secure connection is required. The value may, in some uses, be a randomly generated unique number.

If the server sends a cookie with a value of a randomly generated unique number, the server may store a mapping, the mapping between the random number and the actual resource identifier. An attacker may compromise the server by generating a large number of requests for resources—some of which may not even exist—to cause the server to store a large number of entries in its database storing the mappings. If a large number of attackers coordinate their requests, it may result in the server's resources being overwhelmed—this is known as a denial-of-service attack.

In one embodiment, the cookie received from the server with the requested file's URL may serve as a resource-identification cookie.

In step 314, the cookie may be stored on the client device. Each further request from the client device may carry the cookie to the server (e.g., following the specifications of the HTTP protocol). In one embodiment, this may provide the server with access to the originally requested file's URL without storing the URL in the server's memory. By avoiding storing the URL in the server's memory, the server may be protected from a potential denial-of-service attack.

In another embodiment, the value of the identification cookie may be the resource identifier (e.g., URL). This contrasts with another approach, which may include assigning a randomly generated unique number to the value of the identification cookie and storing, at the server, a mapping between the random number and actual resource identifier. If the value of the identification cookie is or includes the resource identifier, the server avoids the need to store the mapping, and the server is better protected from a potential denial-of-service attack.

In step 316, the client device may authenticate through whatever authentication channels the enterprise uses. In one embodiment, the user may enter user credentials into the client device. The client device may authenticate by sending authentication credentials to the server device.

In step 318, the user credentials may be verified by the gateway. Once authenticated, the gateway may redirect the user to a generic enterprise-landing page with web links to various enterprise resources, such as resources hosted in a private enterprise cloud.

In another embodiment, if the authentication credentials are correct, the server device may respond to the authentication credentials by transmitting to the client device a confirmation. In one approach, an authentication gateway may respond to a successful authentication by redirecting the client device to a common landing page, such as the enterprise homepage, a page indicating successful authentication, or another page. In another example, an authentication gateway may send a user to a user-specific page, such as a user-account-management page, or a user portal. Any of the above uses, however, may result in a poor user experience, because the user is presented with a page or site other than the originally requested resource. The user may have to reclick the original link, manually navigate to the resource, or otherwise take further action before navigating to the originally requested resource.

In another embodiment, the confirmation from the authentication gateway may include a redirect response. The redirect response may redirect the client device to the URL of the requested file. In one embodiment, the server may fetch the URL from the value of the cookie included in each request from the client device (as described above). In one embodiment, after fetching the URL, the server may expire the cookie if it is of no further use. For example, the resource-identification cookie may not have any other use, because the server may have already retrieved the resource URL, and therefore has the URL after authentication.

In a further embodiment, the server response to the client device may include a new authentication cookie that the client device may send with each further request to indicate the client device is already authenticated to the server. In one embodiment, the new cookie may be similar to an authentication-token sent to the client after the authentication. Presence of this cookie in each further request from client may indicate that the client device is already authenticated to the server. In a further embodiment, the new cookie may serve as an authentication cookie.

In another embodiment, the server may set a session cookie that indicates the client device is authenticated. The session cookie may be included with future requests to indicate the client device is authenticated.

In step 320, the client device may transmit a request for the requested file. For example, the client device may send a GET request that includes the identifier (e.g., the URL) of the requested file. In one embodiment, as mentioned earlier, the request for the requested file may include a session cookie or some other authentication indicator indicating the client device is authenticated.

The server device may receive the request for the requested file. In one embodiment, the server device may directly access the requested file. In another embodiment, the server device may confirm the client device's authentication status by checking the authentication indicator. The server device may generate a new request for the requested file, sending the new request to another device, such as a file server, or some enterprise resource that stores files. The new device may, again, directly access the file, or alternatively may retrieve the file from another location.

In step 324, the client device receives the requested file. The requested file may be transmitted directly from the device storing the file. In another embodiment, the device storing the file may transmit the file back to the client device by passing through one or more other devices, such as the server device.

Figure 4:
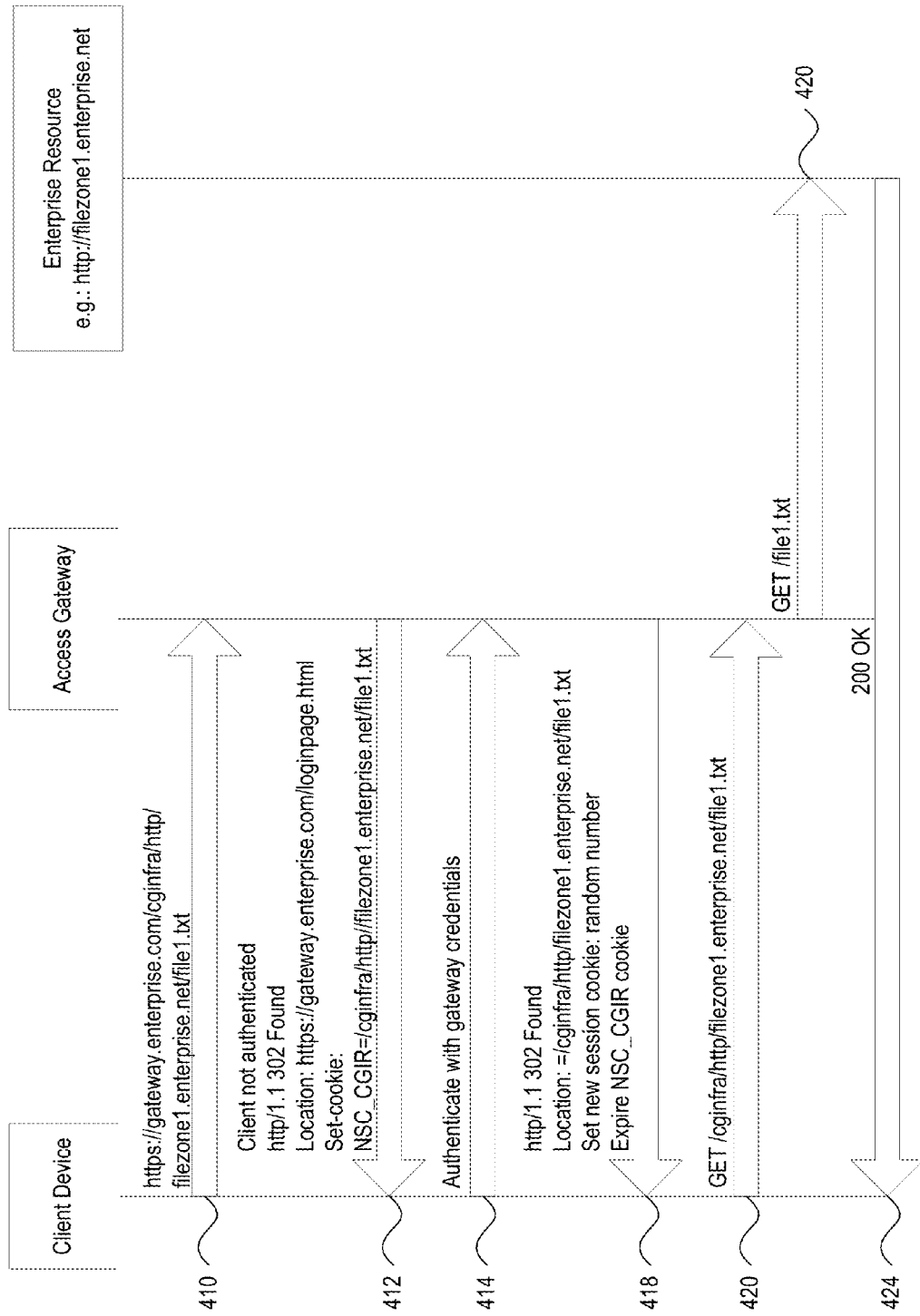
FIG. 4 depicts an illustrative embodiment of a method for accessing enterprise resources while providing denial-of-service attack protection.

FIG. 4 depicts the steps one system embodiment may take in an example of redirecting to a specific enterprise resource from an access gateway, while making the system less vulnerable to a denial-of-service attack. In this example, a private enterprise cloud—such as a File Storage Zone—may host an enterprise resource (e.g., a file). An enterprise user may receive an email containing an appropriately crafted identifier (e.g., a URL) to a file hosted on the File Storage Zone.

In one example, the client device may use a browser, secure web browser, secure web-browser application, secure application, or other application on the client device for communication. In another embodiment, sending a request by a client device or receiving a request by a server device may occur via an application-specific VPN.

If an unauthenticated user clicks on the identifier, a client may send a corresponding HTTP request to an SSLVPN access gateway, as is illustrated in step 410. In the illustrated example, this occurs when the client device user clicks the URL identifier https://gateway.enterprise.com/cginfra/http/filezone1.enterprise.net/file1.txt.

In another example, a URL that accesses a specific enterprise resource through an SSLVPN gateway may take the form: https://gateway.enterprise.com/cginfra/http/resource.enterprise.net/file1.txt. In this example, the SSLVPN gateway may be "https://gateway.enterprise.com." Here, the desired enterprise resource may be "http://resource.enterprise.net/file1.txt." In this example, "/cginfra/" may be a prefix the gateway uses to process the request and connect to the desired intranet resource that follows.

In the same example, a corresponding HTTP request may be: "GET/cginfra/http/resource.enterprise.net/file1.txt," with a Host at "gateway.enterprise.com."

At step 412, the gateway may detect that the client device is unauthenticated. If the client device is unauthenticated, the gateway may respond to the HTTP request with a redirect response (e.g., an HTTP response with status code "302 Found," which may be known as an HTTP 302 redirect). A redirect response may include a URL in a Location header field. In one embodiment, the URL may be associated with an authentication page. In the illustrated example, an HTTP redirect response includes a URL to an authentication page at https://gateway.enterprise.com/loginpage.html.

The authentication page may be provided by an authentication gateway. The authentication gateway, in one embodiment, may be separate from the gateway. In another embodiment, the gateway and the authentication gateway may be the same computing device; in other words, a single computing device may include the gateway and the authentication gateway.

In one embodiment that may provide a seamless user experience, the authentication gateway may after authentication redirect the client device to the originally requested file (instead of redirecting to a common landing page). In order to achieve this, the gateway may need the identifier (e.g., the URL) of the originally requested file.

In one approach, the gateway may remember the originally requested resource by inserting a cookie in the redirect response the gateway sends, such as the response the gateway sends in step 412 when it redirects the unauthenticated client to the authentication page. In one approach for generating the cookie value, the cookie may have an associated random number. The random number may be long to make it hard to predict. The gateway may store in memory a mapping between the requested resource URL and the random number associated with the cookie.

But a long random number and corresponding mapping may, in one embodiment, make the gateway vulnerable to a denial-of-service attack. For example, an unauthenticated client device (e.g., one used by an attacker), may continuously send a large number of unauthenticated requests for different enterprise resources (including potentially non-existent resources). If the gateway stores the random number and associated mapping for each unauthenticated request, the large number of requests may exhaust the gateway's memory or other resources.

An alternative method may prevent or lessen the impact of a denial-of-service attack. While redirecting the unauthenticated client device to the authentication page, the gateway may include, in the redirect response, the actual URL of the requested enterprise resource. In one embodiment, the complete URL of the requested enterprise resource itself may be included in a cookie (instead of a random number, which has the vulnerability described above). In the illustrated example, the cookie may be named NSC_CGIR. The cookie's value may contain the URL of the requested specific enterprise resource; in the illustrated example, /cginfra/http/filezone1.enterprise.net/file1.txt. In this method, the gateway may not store the requested URL in memory, because each further request from the client to the gateway may include the cookie with the requested URL.

The HTTP redirect response (described above) may invite the client to send a new HTTP request—identical to the initial request sent in step 410, other than its destination—to the authentication URL received in the HTTP redirect response.

At step 414, the client device may authenticate to the gateway by supplying user credentials to the authentication page. In one embodiment, authenticating the user credentials may act as a single sign on for accessing one or more enterprise resources.

In one embodiment, the gateway may—after authentication—redirect the client device to the initially requested specific enterprise resource, rather than to a common landing page.

At step 418, the gateway may redirect the client device to the requested specific enterprise resource. In one embodiment, the gateway may redirect the client device by sending an additional redirect response after authentication.

When the gateway redirects the client device to the initially requested resource, the cookie with the specific resource URL may expire. At step 418, the gateway may expire the NSC_CGIR cookie.

The gateway, however, may include a new cookie in the redirect response, the new cookie serving as an authentication token for the client. In one example, the redirect response to the specific resource may include a session cookie with a random number. The session cookie may be included in each additional request to authenticate the client device.

At step 420, the client device may request the desired specific enterprise resource through a GET request.

At step 422, the access gateway may use another GET request that includes the session cookie to access the specific enterprise resource.

At step 424, the resource may be provided to the client device via the gateway.

In one embodiment, when the resource is of a type that may be downloaded (e.g., the resource may be a file), after the client device receives access to the resource, the client device may download and store the resource on the client device. In one example, the client device may download the resource to use for a short time, after which the resource may be deleted from memory. In another example, the client device may download and store the resource on a secure area of the client device, such as an encrypted folder, a separate partition, or other secured area. In a further example, the client device may download and store the resource on an unsecure area of the client device. In an additional example, the client device may be provided access to the resource, but restricted from downloading the resource. For example, the client device may be limited to viewing or accessing the resource in a web-browser window, a secure application, or another similarly limiting manner.

In a further embodiment, the resource may be of a type that may not be stored on the client device (e.g., the resource may be a web service or application, or access to a network). In one example, the client device may access the resource through a web browser, a direct connection, a secure tunnel, or another method. Alternatively, the gateway may provide a connection between the client device and the resource.

The system and method described herein may improve the end-user experience with requesting an enterprise resource that requires authentication to access. The system and method may provide an improved experience by directly providing the requested resource after authentication, rather than redirecting the client device to a common landing page. The described approach may avoid making the system vulnerable to a denial-of-service attack.

Although the subject matter has been described in language specific to structural features or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, at a gateway from a client device, a first request for a resource, the first request comprising a location identifier of the resource;
transmitting, to the client device, a redirection message that redirects the client device to an authenticator for authentication of credentials, wherein the redirection message comprises a resource-identification cookie, wherein the resource-identification cookie is configured to provide a level of protection against denial-of-service attacks to the gateway and comprises the location identifier of the resource;
authenticating credentials received from the client device conditioned upon the location identifier of the resource being extracted from the resource-identification cookie;
expiring, after authenticating the credentials, the resource-identification cookie;
transmitting, after authenticating the credentials, a session cookie to the client device;
receiving, from the client device, after authenticating the credentials, one or more second requests for the resource, wherein the one or more second requests comprise the session cookie and the location identifier of the resource; and
providing, based on the one or more second requests, access to the resource.

2. The method of claim 1, wherein the location identifier comprises a uniform resource locator (URL) of the resource.

3. The method of claim 1, wherein the gateway comprises a secure-sockets-layer virtual-private-network (SSLVPN) gateway.

4. The method of claim 1, wherein the resource comprises an application store.

5. The method of claim 1, wherein the first request is received from a browser running on the client device, and the first request comprises a hypertext transfer protocol (HTTP) request.

6. The method of claim 1, wherein the gateway does not store a mapping of a value in the resource-identification cookie to the location identifier of the resource.

7. The method of claim 1, wherein the resource-identification cookie does not comprise a unique random number.

8. The method of claim 1, wherein the one or more second requests comprises a plurality of second requests, and wherein receiving, from the client device, after authenticating the credentials, the one or more second requests for the resource comprises:
receiving the location identifier of the resource in a first of the plurality of second requests; and
receiving the session cookie in a second of the plurality of second requests.

9. A method comprising:
receiving, at a gateway from a client device, a request for a resource, the client device being unauthenticated to the gateway, the request comprising a location identifier of the resource;
transmitting, to the client device, in response to the request, a first redirection message comprising data indicating a redirection to an authentication device, and a resource-identification cookie that comprises the location identifier of the resource, wherein the resource-identification cookie is configured to provide a level of protection against denial-of-service attacks to the gateway;
receiving, at the authentication device from the client device, user credentials and the resource-identification cookie;
extracting the location identifier of the resource from the resource-identification cookie received from the client device, resulting in an extracted location identifier of the resource;
authenticating, by the authentication device, the user credentials;
expiring, after authenticating the credentials, the resource-identification cookie;
generating a session cookie in response to authenticating the user credentials;
transmitting, to the client device, after authenticating the credentials, a second redirection message comprising data indicating a redirection to the extracted location identifier of the resource, the second redirection message comprising the session cookie;
receiving an additional request from the client device, the additional request comprising the session cookie; and
providing access to the resource in response to the additional request.

10. The method of claim 9, wherein receiving, at the gateway from the client device, the request for the resource comprises:
receiving the request for the resource via an application-specific virtual private network (VPN).

11. The method of claim 9, further comprising:
storing the resource in a secure area of the client device.

12. The method of claim 9, wherein the location identifier comprises a uniform resource locator (URL) of the resource.

13. The method of claim 9, wherein the generating of generating the session cookie is conditioned upon authenticating the user credentials and transmitting the first redirection message to the client device.

14. The method of claim 9, wherein a single computing device comprises the gateway and the authentication device.

15. The method of claim 9, wherein the gateway does not store a mapping of a value in the resource-identification cookie to the location identifier of the resource.

16. A system comprising:
one or more computing devices; and
one or more non-transitory computer-readable media storing executable instructions that, when executed by the one or more computing devices, cause the one or more computing devices to:
receive, from a client device, a first request for a resource, the first request comprising a location identifier of the resource;
transmit, to the client device, a redirection message that redirects to an authenticator for authentication of credentials, wherein the redirection message comprises a resource-identification cookie, wherein the resource-identification cookie is configured to provide a level of protection against denial-of-service attacks to the one or more computing devices and comprises the location identifier of the resource;
authenticate credentials received from the client device, conditioned upon the location identifier of the resource being extracted from the resource-identification cookie;
expire, after authenticating the credentials, the resource-identification cookie;
transmit, after authenticating the credentials, a session cookie to the client device;
receive, after authenticating the credentials, one or more second requests for the resource, wherein the one or more second requests comprise the session cookie and the location identifier of the resource; and
provide, based on the one or more second requests, access to the resource.

17. The system of claim 16, wherein causing the one or more computing devices to generate the session cookie comprises causing the one or more computing devices to generate the session cookie in response to determining that the credentials have been authenticated.

18. The system of claim 16, wherein the one or more second requests comprises a plurality of second requests, and wherein causing the one or more computing devices to receive, after authenticating the credentials, the one or more second requests for the resource comprises causing the one or more computing devices to:
receive the location identifier of the resource in a first of the plurality of second requests; and
receive the session cookie in a second of the plurality of second requests.

* * * * *